INVENTOR.
WALTER T. SELSTED

June 8, 1954   W. T. SELSTED   2,680,386
FILTERED MOTOR DRIVE
Filed June 27, 1950   2 Sheets-Sheet 2
FIG_2_
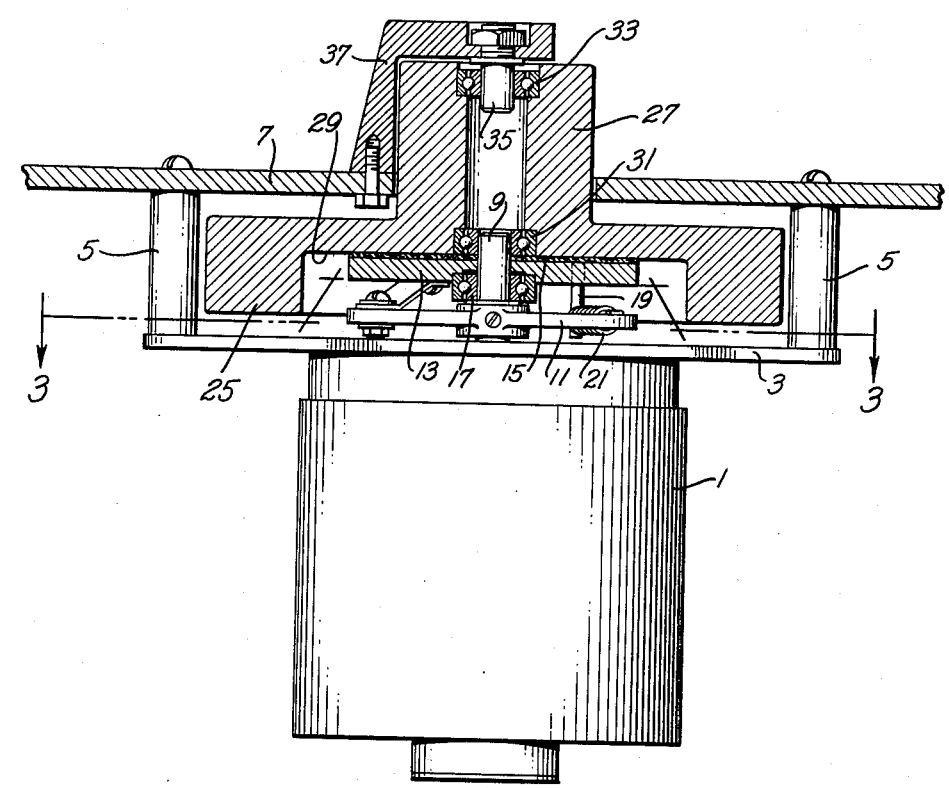
FIG_3_
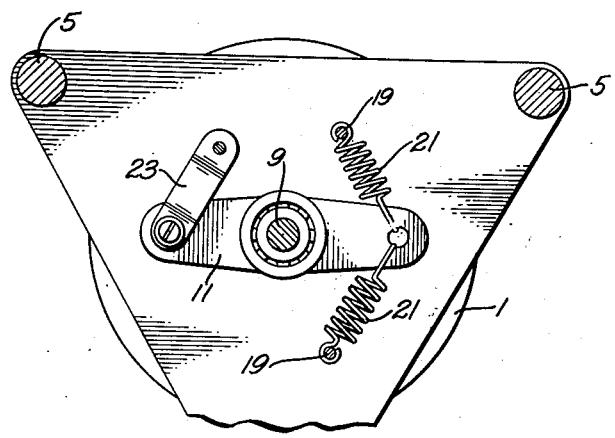
FIG_4_
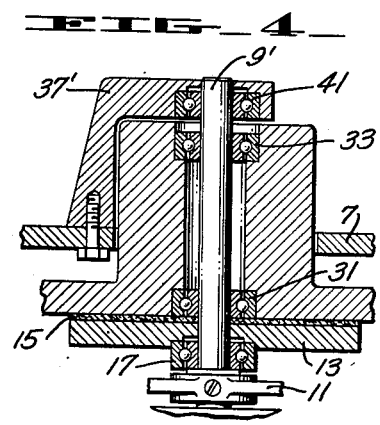
INVENTOR.
WALTER T. SELSTED
BY
Lippincott & Smith
Attorneys

Patented June 8, 1954

2,680,386

UNITED STATES PATENT OFFICE 2,680,386

FILTERED MOTOR DRIVE

Walter T. Selsted, San Mateo, Calif., assignor to Ampex Electric Corporation, San Carlos, Calif., a corporation of California Application June 27, 1950, Serial No. 170,659

7 Claims. (Cl. 74—574)

This invention relates to motor drives for sound recording and reproducing systems and to like applications where it is important that speed or torque variations of short period be eliminated from the driven member. While it is particularly applicable to drives for tape as used in magnetic recording and reproducing systems, and will be specifically described in this connection, the principles involved therein may be employed in other drives where like conditions of operation prevail.

In all sound recording systems of high quality it is essential that the speed of the recording medium be kept a constant, not only upon the average but particularly as regards short-term oscillations which produce the effect known as "flutter." For many purposes it is desirable that the apparatus be driven from ordinary alternating current supplies. Such supplies are, in general, extremely constant in frequency and synchronous motors powered thereby maintain their average speed and torque to a high degree of precision. It is usually impractical to use polyphase supplies for motors in applications of this character. In single phase motors the driving torque is applied intermittently, the driving impulse rising from zero to a maximum and falling back to zero again twice in each cycle of the supplied current, causing a speed variation which occurs at the rate of 120 times per second when the drive is the usual 60-cycle current. Even in polyphase and split phase motors there is a component of torque which varies at this frequency.

For most purposes the speed variation thus introduced is too slight to cause any noticeable effect, being reduced to negligible proportions by the inertia of the rotor. When used as a drive in sound systems, however, the requirements are so severe that additional devices must be used to smooth out the velocity curve, and many mechanical filter systems have been devised for this purpose. Practically without exceptions such systems include one or more flywheels to give an additional inertial effect and some sort of resilient driving connection between the motor and the flywheel to take up the speed variations and to permit the flywheel to rotate at constant angular velocity.

The higher the speed of the motor used in such systems the easier the filtering becomes. The energy stored in the flywheel is proportional to its moment of inertia and to the square of its angular velocity; therefore the higher the speed of the motor the lighter and more compact the mechanical filter system can be made. Accordingly it has been customary to use motors operating at 1800 or even 3600 R. P. M., corresponding to two-pole and four-pole motors respectively when the conventional types are used. This, however, has its own disadvantages since if the recording medium itself be driven at high speed it is wasteful of recording space and stepdown gearings, even when made with the utmost precision, themselves introduce flutter at geartooth frequency or, if friction types of drive are used, are liable to slipping which may introduce speed variations of even greater proportion.

In driving magnetic recording tapes these difficulties have been, in general, comprised, the usual type of drive being a capstan of small diameter either constituted by or mounted directly upon the motor shaft, the capstan driving the tape by its friction therewith and the tape itself driving, also frictionally, a filter mechanism which maintains constant the speed of the specific portion of the tape on which the recording is being done or from which it is being reproduced, a loop whose length may be varied being interposed between this portion of the system and the drive itself.

The small size of the capstan used in this system introduces difficulties. In order to provide a positive drive the tape must be in contact with a large portion of the periphery of the capstan. A larger capstan, turning at a lower angular velocity, would be desirable in many ways.

Recently there have been devised multipole, self-starting synchronous motors which operate at relatively very low speeds, e. g., 75 R. P. M. From the point of view of the designer of sound recording and reproducing equipment such motors appear very attractive; they would permit the use of large capstan drives and would apparently result in a great simplification of the recording equipment. In the past their use has not proved feasible however, since filter systems designed in the usual manner have not sufficed to eliminate the objectionable flutter, which appeared in the recordings in spite of the use of filters theoretically more than ample to attenuate the speed variations to the required degree.

The above enumerated difficulties in the use of low speed motors of this character have been removed by my invention, which has, among its objects, to provide a filtered drive system which is extremely effective and which is, at the same time, light, simple, rugged, and easy to adjust and to keep in adjustment; to provide a filtered tape drive which requires no additional filter operating upon the tape itself; and to provide a drive system wherein the inertial elements of the system do not impose so great a starting load upon the motor as to require manual starting or additional starting apparatus.

I have discovered that the refractory flutter which has persisted with all types of tape drives when use of motors of the type mentioned has been attempted heretofore can be traced to transverse vibrations of the motor shaft. Broadly considered, therefore, my invention comprises the combination with such a motor of a flywheel mounted coaxially with the shaft of said motor, a resilient driving connection between said motor and said shaft, a drive element or capstan fixed to and concentric with said flywheel, and means for restraining said flywheel and capstan against vibrational motion imparted by flexure of said shaft.

The device will be more fully understood by reference to the ensuing detailed description of the preferred form thereof, taken in connection with the accompanying drawings wherein:

Fig. 2 is an axial sectional view of the filter mechanism, the motor being shown in elevation;

Fig. 3 is a transverse sectional view of the device, the plane of section being indicated by the lines 3—3 of Fig. 2; and Fig. 4 is a fragmentary sectional view showing a modified bearing arrangement for mounting the flywheel.

Figure 1:
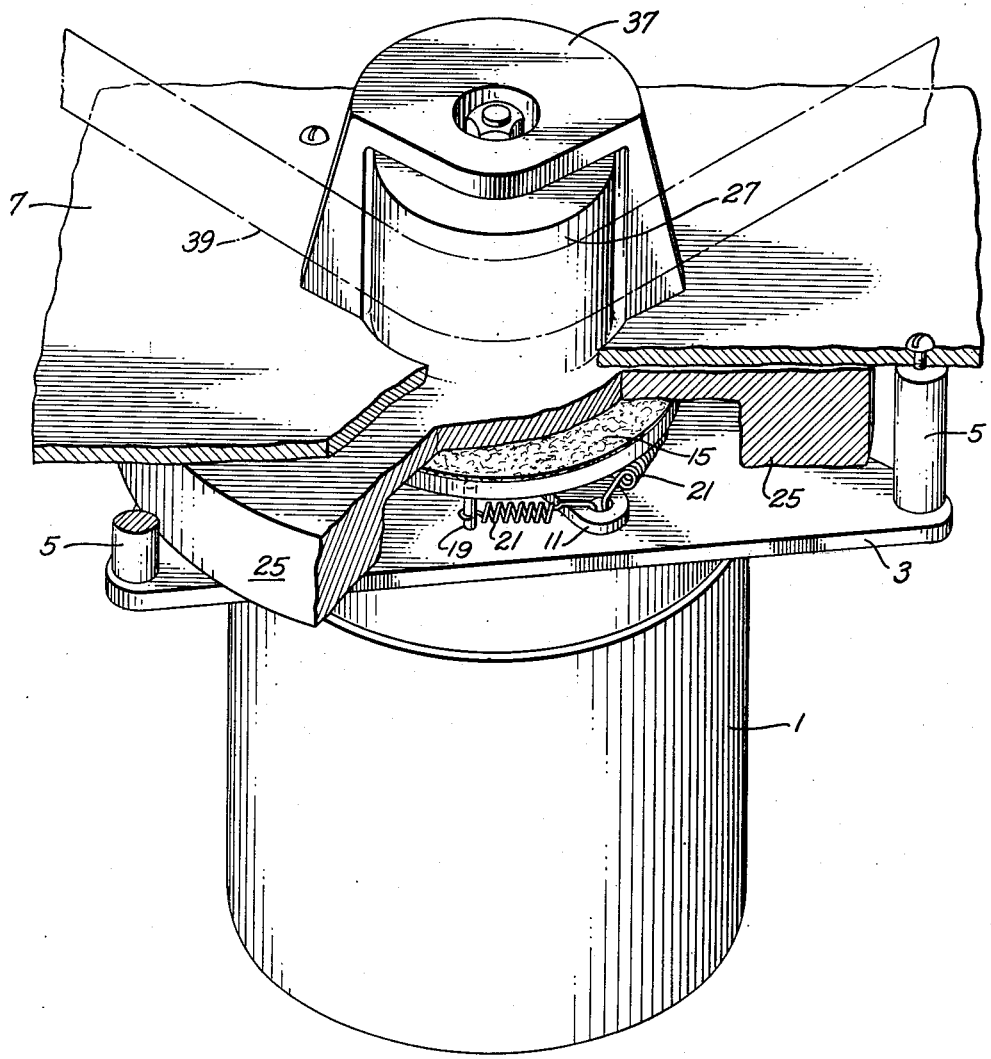
Fig. 1 is an isometric view, partly in section, of the device of this invention as utilized to drive a magnetic record.

As is shown best in Figs. 1 and 2 the slow speed motor 1 which is shown as being a split-phase synchronous motor of the type marketed by the General Electric Company under the type designation 5MY is secured to a mounting plate 3 which takes the place of or is fastened to one of the motor bells which include one of the usual motor shaft bearings, and this plate is fastened by standoffs 5 to a table top or panel 7, from which the assembly hangs with the motor shaft 9 substantially vertical. A torque arm 11 is fixed to the shaft for rotation therewith. Journaled on the shaft 9 above the torque arm 11 is a disc clutch element comprising a circular plate 13 to which a disc of friction material 15, such as, for example, nylon felt, is cemented or otherwise secured. The journal for the disc clutch member 13 is in this case an antifriction ball bearing of the standard type, as designated by the reference character 17. It might appear that a self-aligning bearing should be used here, but as the displacements due to shaft flexure are of the order of 0.0001 inch the ordinary type of bearing allows adequate play.

A pair of pins 19 project down from the disc 13. A pair of springs 21 connect these pins with the torque arm 11, as is best shown in Fig. 3, the springs 21 being somewhat stressed and thus forming a resilient driving means connecting the motor shaft with the friction-clutch member. A link 23 formed of a material having a high internal coefficient of friction, such as Viscoloid, soft rubber, or rubber impregnated fabric, also connects between the torque arm 11 and the disc 13 to damp out any tendency to set up oscillations between the torque arm and the friction disc.

A flywheel 25, which in this case has a capstan 27 formed integrally therewith and having a surface 29 which is complementary to the friction clutch element, rests upon this clutch element with its weight supported thereby. The flywheel has a lower antifriction bearing 31, also preferably a ball bearing, by means of which it is journaled upon the shaft 9. The inner race of this ball bearing is not force fitted upon the shaft as is the usual practice, but is slidably mounted thereupon so that the shaft does not support the weight of the flywheel. Instead this weight supplies the pressure which engages the two clutch surfaces.

An upper bearing for the flywheel-capstan combination is supplied by a third antifriction bearing 33 carried by the distal or capstan end of the device. A fixed stub shaft or guide 35 slides within the inner race of the bearing 33, this shaft being carried by an outboard bracket 37 mounted upon the table or panel top 7. When as used, as in the present instance, as a tape drive, the bracket 37 largely surrounds the capstan, leaving approximately 90 degrees of its periphery exposed to contact with the tape 39, as shown in Fig. 1. Such enclosure of the capstan prevents unintentional entanglements of the tape therewith and renders threading of the device easier.

In assembling the device the clutch parts, including the flywheel, can be stacked on top of the motor, with the bearing bracket 37 secured to the table top 7, and the whole arrangement, including the mounting plate 3 inserted in place and the standoffs 5 tightened. If the holes for mounting both the bracket and mounting plates have been jig drilled with only reasonable accuracy no further alinement will be found to be necessary; there is considerable latitude of adjustment which does not cause binding or the introduction of irregularities into the drive. This is in sharp contradistinction to most mechanical filters of this general character, which must be alined and adjusted with utmost precision.

The flywheel 25 is, as will be seen from its general proportions, relatively heavy. In starting it therefore imposes a large inertial load upon the motor, to which is added the inertia of at least a portion of the tape and possibly, in addition, that of the reels upon which the tape is wound before and after running through the equipment. There is also imposed upon the motor the friction load involved in drawing the tape through the sound heads and all or part of the winding and unwinding load. Motors of this character have a relatively small starting torque in comparison to their running torque. The friction coating 15 of the clutch is so chosen that if the flywheel 25 is held stationary and current applied to the motor the latter will nonetheless start, the clutch surfaces slipping to permit this. The friction between the clutch surface is, however, sufficient to start the flywheel gradually when it is released, as it actually is in all practical cases, and it quickly comes up to speed so that the slipping of the clutch ceases.

Motors of this character have ample power to supply the frictional losses inherent in the actual driving of the recording system, and this power too is readily transmitted by the clutch once the system is in operation. The inertial load of the flywheel and the remainder of the parts which must be started is, however, directly proportional to the rapidity with which the moving system is brought up to speed and if the attempt were made to do this substantially instantaneously the inertial load would be so great that the motor would stall. The slipping clutch prevents such stalling but since the slipping dissipates power the relative motion between the two elements of the clutch is quickly damped out and thereafter the parts turn as a unit.

Careful observations of the device in operation show that no slipping of the clutch occurs when it is operating properly at running speed, although it may occur if the springs 21 are made too stiff for proper filtering. The effectiveness of the device rather depends upon the fact that the way in which the flywheel is mounted prevents any flexure or "whipping" of the shaft being imparted thereto. The fact that the torque arm 11 is connected to the shaft so close to its bearing in the motor 1 makes the moment of the forces upon it which would tend to flex the shaft very small and thus tends to minimize any flexure which might otherwise occur. To the extent that it does occur it is minimized by the method of mounting the flywheel. The upper bearing 33 of the latter is held perfectly steady so that it cannot partake of any whipping motion. Any flexure of the shaft which may occur, tending to displace its upper end, can be taken up in the ball bearing 31 and exerts only second or third order effects upon the speed of rotation. In practice it is found that if the flywheel be merely journaled upon a full length shaft of normal diameter the flutter imparted to the tape is so severe as to make the use of such a device impossible for high quality recording and reproduction, and to just the extent that such whipping is minimized the performance of the device is improved. The shaft 9 can be extended to run in a bearing carried by the bracket 37, leaving the device otherwise the same. This results in a great reduction of flutter if the upper flywheel bearing is closely adjacent the bracket and the shaft bearing in the bracket is tight, but is much harder to assemble with the accuracy required for such an arrangement and is not as effective as the method of mounting here shown.

The flexure or whipping of the shafts of a motor of this character is occasioned by the lateral pull upon the rotor which is incidental to the tangential pull causing rotation. The shaft is held rigidly in position at the two fixed points of the end bearings of the motor, the shaft extending beyond the bearings at one end to a greater or less degree as prescribed by the equipment to be driven by it. The bearings establish nodal points on the shaft, as a result of which if the rotor flexes the shaft in one direction the free end of the shaft, extending beyond the bearings, moves in the opposite direction, this motion being more extensive the greater the distance the shaft extends beyond the end bearing. Owing to the relative size of the shafts as supplied by the manufacturer they would ordinarily be considered to be perfectly rigid and therefore, in the past, in constructions of this general type convenience and economy have appeared to dictate that the flywheel be directly upon it. For the purposes of tape drives, however, this is the worst situation that could be met with since the capstan has its maximum degree of lateral motion very near to the portion which engages the tape.

The whip can be taken out of the shaft to a very large extent by using the construction shown in Fig. 4, wherein the extended motor shaft is indicated by the reference character 9' and is journaled in a bearing 41 carried by the bracket 37'. This construction, while effective, must be adjusted with great precision; the bearing 41 must be of the greatest precision and preferably of the pre-stressed type since, as has been indicated, a movement of the capstan of $\frac{1}{10000}$ of an inch is sufficient to introduce flutter. For this reason the construction shown in Figs. 1 and 2 is greatly preferable, since the only point at which the flywheel is borne upon the shaft itself is very close to the node imposed by the motor bearings and the amplitude of motion imposed upon the shaft at this point is very small and can be practically wholly absorbed by the play in the ball bearings. Since the upper end of the capstan is held steady and the tape runs around this upper end, and since, further, any vibration which could occur is about a fulcrum established by the upper bearing 33 such vibrational motion as might be transferred to the flywheel and capstan by oscillation of the shaft is reduced by the lever arm between the bearings 31 and 33, resulting in a reduction of amplitude in the ratio of 3 or 4 to 1 of any motion which might be imparted at the point of the lower flywheel bearing. Without the upper bearing, however, instead of being reduced by this factor the motion would be multiplied by approximately the same factor. The preferred construction therefore serves not only to prevent initial transfer of undesired vibration from the shaft to the flywheel but also, by changing the center about which any such vibration does occur, to prevent its being transferred to the tape.

I claim:

1. In combination with a motor having a shaft subject to torque variations of shorter period than its period of rotation, a panel supporting member for said motor, a mechanical filter comprising a friction clutch member journaled on said shaft, a resilient driving connection between said shaft and said clutch member, and a flywheel journaled coaxially with said shaft for rotation with respect thereto and to said motor, said flywheel including a surface complementary to said clutch member and engaging the latter with sufficient friction to carry the normal load applied thereto at operating speed but insufficient friction to prevent slippage under the inertial load of starting said flywheel, and an outboard bearing disposed along the axis of said shaft and rigidly affixed to said panel member to restrain the distal end of the flywheel axis against motion transverse thereto, and a capstan attached to the flywheel and concentric thereto for driving a magnetic tape.

2. The combination in accordance with claim 1 in which the resilient driving connection includes a link of material having a high internal friction connecting said clutch member and said motor shaft.

3. The combination in accordance with claim 1 including an inner bearing mounted axially of said flywheel, an outboard support, and a stub shaft carried by said outboard support and engaging said outboard bearing, said inner bearing turning on said motor shaft.

4. A drive for magnetic recording tapes and the like comprising a slow speed multipole motor, means for mounting said motor with its shaft in a substantially vertical position, a driving member fixed to said shaft adjacent its upper end, a friction clutch member journaled on said shaft, a resilient connection between said driving and clutch members, a flywheel including a capstan portion for driving a tape and a surface complementary to said clutch member, said flywheel having a lower bearing journaled on said shaft and resting on said clutch member, and an outboard bearing bracket upon which the upper end of said flywheel is journaled.

5. A drive for magnetic recording tapes and the like comprising a slow speed multipole motor, means for mounting said motor with its shaft in a substantially vertical position, a driving member fixed to said shaft adjacent its upper end, a friction clutch member journalled on said shaft, a resilient connection between said driving and clutch members, a flywheel having a surface complementary to said clutch member, a pair of bearings supported substantially normal to and including the axis of said shaft for positioning said flywheel for rotation, one of said bearings being rigidly affixed against flywheel motion transverse to the axis and the other of said bearings being yieldably mounted to admit of slight flywheel motion transverse to said axis and to absorb any such slight motion.

6. In combination with an electric motor, a friction clutch member journaled upon the shaft of the motor, driving means including a resilient drive connection between the shaft and said clutch member, a flywheel concentric with the motor shaft, means serving to journal the flywheel for rotation independently of rotation of the shaft, said flywheel having a surface thereon which is complementary to the clutch member and in friction driving relation therewith, and a rotatable tape driving member secured to the flywheel.

7. Apparatus as in claim 6 in which mounting means serves to mount the motor shaft in a vertical position in which the weight of the flywheel serves to urge the complementary surfaces of the flywheel and the clutch member together to establish a friction driving relation.

References Cited in the file of this patent

UNITED STATES PATENTS

| Number | Name | Date |
| --- | --- | --- |
| 1,913,984 | Hann | June 13, 1933 |
| 2,360,157 | Olson | Oct. 10, 1944 |
| 2,454,980 | Sobell | Nov. 30, 1948 |